United States Patent [19]

Murakami

[11] Patent Number: 4,481,620

[45] Date of Patent: Nov. 6, 1984

[54] PREGROOVED OPTICAL-DISK

[75] Inventor: Teruo Murakami, Yokohama, Japan

[73] Assignee: Tokyo Shibaura Denki Kabushiki Kaisha, Kawasaki, Japan

[21] Appl. No.: 351,211

[22] Filed: Feb. 22, 1982

[30] Foreign Application Priority Data

Mar. 24, 1981 [JP] Japan ................................. 56-42891

[51] Int. Cl.³ ........................ H04N 7/00; H04N 23/00
[52] U.S. Cl. .................................. 369/275; 369/272; 369/109
[58] Field of Search ................ 358/342; 369/109, 272, 369/275

[56] References Cited

FOREIGN PATENT DOCUMENTS

| 2944744 | 11/1979 | Fed. Rep. of Germany . | |
| 55-55448 | 4/1980 | Japan . | |
| 55-55449 | 4/1980 | Japan . | |
| 56-61048 | 5/1981 | Japan | 369/275 |
| 2016747 | 3/1979 | United Kingdom . | |

OTHER PUBLICATIONS

IEEE Spectrum, vol. 16, No. 8 (Aug. 1979), K. Bulthuis et al., "Ten Billion Bits on a Disk," pp. 26-33.
Patent Abstracts of Japan, vol. 5, No. 88 (June 9, 1981), & Japanese Patent 56 34154.
Patent Abstracts of Japan, vol. 5, No. 122 (Aug. 7, 1981), & Japanese Patent 56 61047.
Patent Abstracts of Japan, vol. 1, No. 73 (July 14, 1977), & Japanese Patent 52 10102.

*Primary Examiner*—Robert L. Richardson
*Attorney, Agent, or Firm*—Oblon, Fisher, Spivak, McClelland & Maier

[57] ABSTRACT

An optical-disk according to an embodiment of the invention is disclosed. The optical-disk has a transparent substrate which has a surface in which a tracking groove is formed and which is made of a polymethyl methacrylate having a refractive index $n_1$ of about 1.49, a transparent layer of polystyrene which is formed on the transparent substrate and which has a refractive index $n_2$ of about 1.59, and a recording layer which is formed on the transparent layer of polystyrene and which is made of a substance which is melted by a pulse laser beam for recording, which becomes incident thereon through the transparent substrate and the transparent layer of polystyrene.

10 Claims, 5 Drawing Figures

F I G. 4
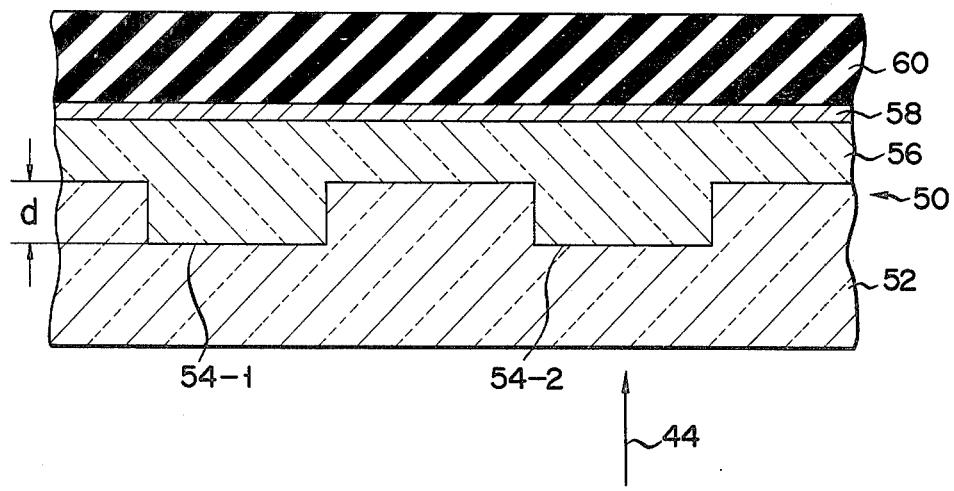
F I G. 5
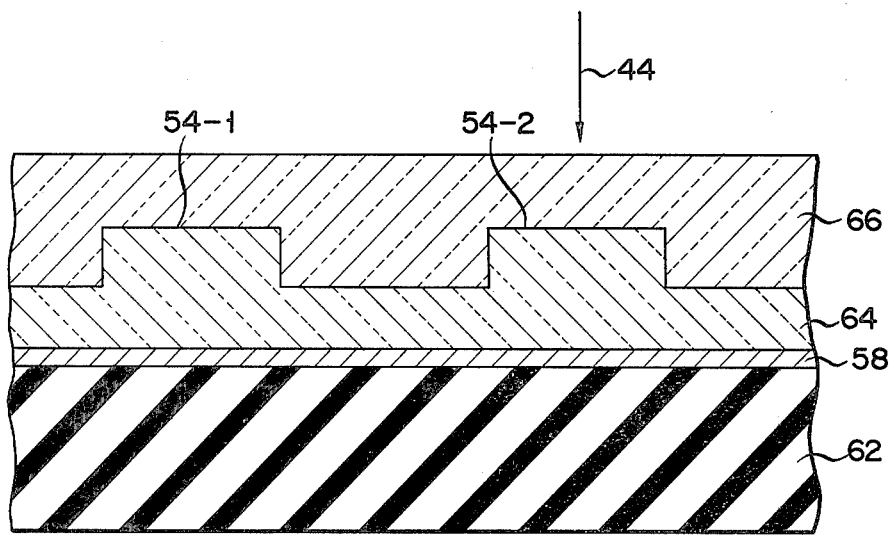

PREGROOVED OPTICAL-DISK

BACKGROUND OF THE INVENTION

The present invention relates to an optical type information recording medium and, more particularly, to an optical-disk for recording and/or reconstruction of information signals using an energy beam such as laser.

Recently, optical-disks have been developed as one type of recording media which are capable of recording information at high density and big capacity. In a recording/reconstruction apparatus which uses an optical-disk of this type, tracking grooves about 0.6 $\mu$m in width and 1.5 to 2 $\mu$m in pitch are formed in the optical-disk in advance, and a focused laser beam having a spot diameter of about 1 $\mu$m is radiated on the groove to record information signals. The tracking control is performed through detection of the changes in the levels of reflected light signals and transmitted light signals which correspond to the positional relationship between the tracking grooves and the beam spot of the laser beam on the optical disk. The recording/reconstruction apparatus includes a differentiator and a single axis position sensor which receives the light signals by dividing them into halves to generate first and second electric signals. When the center of the laser beam spot coincides with the center of the tracking groove, the single axis position sensor generates first and second electric signals which do not have any level difference. When the center of the beam spot deviates from the center of the tracking groove in the radial direction of the optical-disk, the single axis position sensor generates first and second electric signals which have a level difference which depends on the direction and magnitude of this deviation. By differentiating this level difference, the deviation (tracking error) may be detected. By correcting this tracking error, the laser beam spot is returned to central position and tracking control may be performed with high precision.

In order to reconstruct the information recorded in this manner, the change in the intensity of the reflected light, which corresponds to the presence or absence of a pit which is formed in the tracking groove of the optical-disk, is detected by an adding amplifier which adds the first and second electric signals which are generated by the single axis position sensor.

The shape of the tracking groove formed in the optical-disk as described above is preferably such that the influence of the presence of the tracking groove on the addition result obtained from the single axis position sensor may be reduced to the minimum, and yet the percentage modulation of the differential output may be increased: which output corresponds to the deviation of the center of the laser beam spot from the center of the tracking groove, that is, the tracking error. As an example of the shape of the tracking groove, Japanese Patent Disclosures (KOKAI) No. 55,448/80 and No. 55,449/80 propose a V-shaped groove which has an inclination angle of about 80 to 85 degrees. IEEE SPECTRUM AUGUST, 1979, pp. 26 to 33 proposes a rectangular groove according to which the phase difference between the signals obtained in correspondence with the interior and exterior of the tracking groove equals $\lambda \cdot (m/8)$, where m is an odd integer and $\lambda$ is the wavelength of the laser beam used.

However, with an optical-disk having the conventional tracking groove as described above, the allowable error of the depth of the tracking groove becomes extremely small. For this reason, during the actual manufacture of an optical-disk, it is extremely difficult to form a tracking groove on the optical-disk to satisfy the requirement of the allowable error of the depth of the tracking groove.

SUMMARY OF THE INVENTION

It is an object of the present invention to provide a pregrooved optical-disk wherein the tracking control may be performed with high precision, the allowable error of the depth of a tracking error is great, and therefore the manufacture of the optical-disk is easy.

A pregrooved optical-disk of the present invention has a first layer having a surface on which is formed a tracking groove, and a second layer which is formed on the surface of the first layer. The first layer is made of a transparent substance which has a refractive index $n_1$ whereas the second layer is made of another transparent substance which has a refractive index $n_2$. A recording layer is formed on the substantially flat surface of the second layer. An energy beam such as laser is radiated on this recording layer through at least the first and second layers. The recording layer is made of a substance which is melted when the energy of the incident energy beam exceeds a predetermined energy level.

BRIEF DESCRIPTION OF THE DRAWINGS

FIG. 4 is a schematic sectional view of an optical-disk along the radial direction thereof according to an embodiment of the present invention; and FIG. 5 is a schematic sectional view of an optical-disk along the radial direction thereof according to another embodiment of the present invention, which corresponds to FIG. 4.

DETAILED DESCRIPTION OF THE PREFERRED EMBODIMENTS

Figure 1:
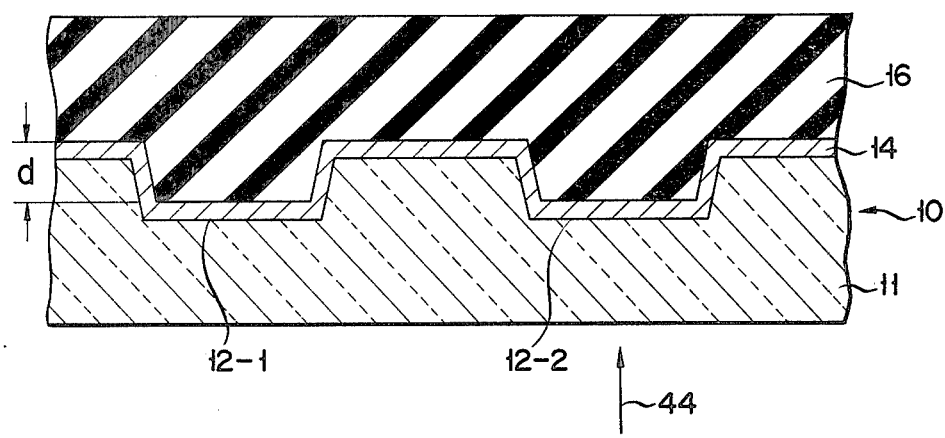
FIG. 1 is a schematic sectional view of a prior art optical-disk along the radial direction thereof.

FIG. 1 is a schematic sectional view of an optical-disk 10 along the radial direction thereof, which is an example of prior art optical type information recording media. In one surface of a transparent substrate 11 are formed recesses 12-1, 12-2 and so on which are continuous in a spiral shape and which have a rectangular section of about 0.6 $\mu$m width. These recesses, that is, tracking grooves 12, are formed by the known injection technique. A recording layer 14 of a predetermined thickness, for example, 600 Å, is deposited on the surface of the substrate 11 in which the tracking grooves 12 are formed. The recording layer 14 is made of tellurium or a compound thereof. A protective layer 16, made of SiO$_2$ or a silicone resin, is formed on the recording layer 14. The overall thickness of the optical-disk 10 of this configuration is set to be about 1.5 mm, for example, (substantially equal to the thickness of one substrate), and the diameter thereof is set to be 300 mm.

Figure 2:
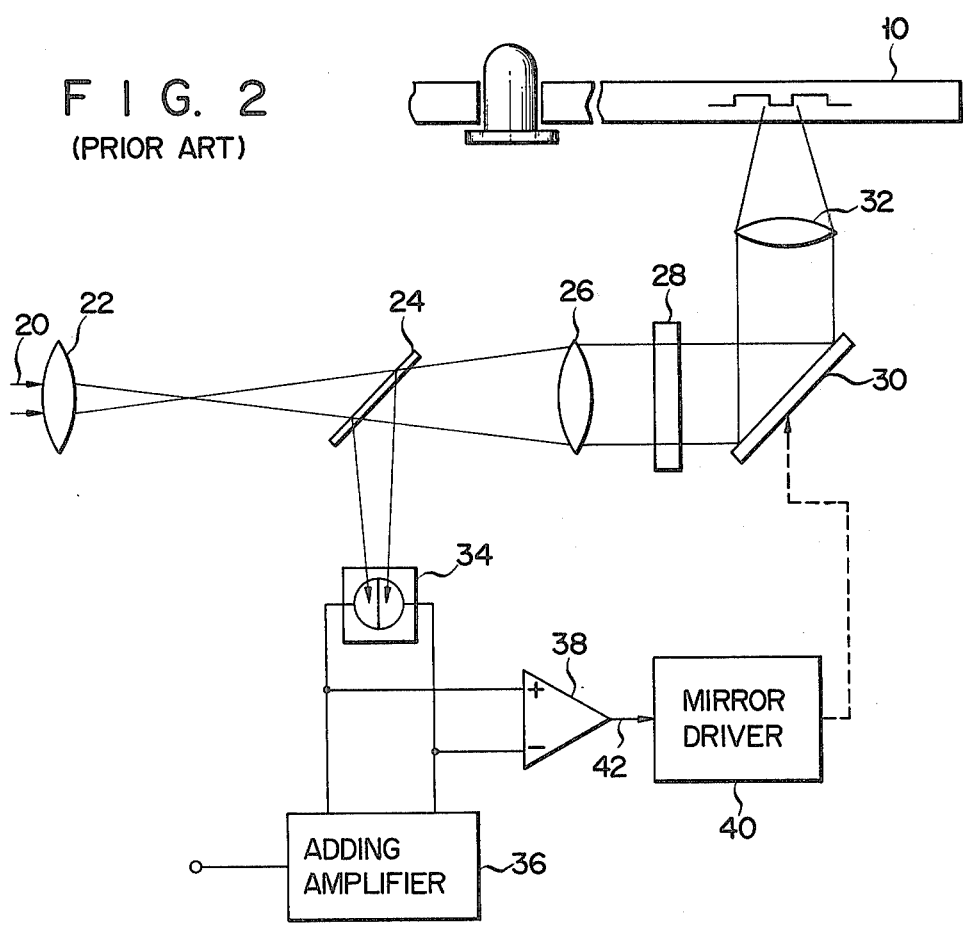
FIG. 2 is a schematic view showing the overall configuration of an information recording/reconstruction apparatus which includes the optical-disk shown in FIG. 1.

FIG. 2 shows schematically the configuration of the main part of an information recording/reconstruction apparatus which includes the optical-disk 10 shown in FIG. 1. A laser beam 20 which is emitted from a laser beam source (not shown) and transmitted through a modulator (not shown) becomes incident on a polarization beam splitter 24 through a lens 22. The laser beam components which have been transmitted through the polarization beam splitter 24 become incident on the optical-disk 10 from the side of the transparent substrate 11 through a lens 26, a quarter wave plate 28, a rotary mirror 30, and a condenser (objective lens) 32. On the other hand, the other beam components which emerge from the polarization beam splitter 24 are radiated on a single axis position sensor 34 which has two subdivided photosensors. Two output signals from the single axis position sensor 34 are supplied to an adding amplifier (adder) 36 as well as to a differentiator 38. The output terminal of the differentiator 38 is connected to the input terminal of a mirror driver 40 which drives the rotary mirror 30 in response to a tracking control signal 42 output from the differentiator 38.

In the recording mode, a pulse laser beam 44 (FIG. 1) which corresponds to the recording information according to the known Pulse Code Modulation technique and which is focused on a spot of a predetermined diameter, for example, 1 μm radiates the tracking groove 12-2 of the optical-disk 10. Then, that part of the recording layer 14 which corresponds to the tracking groove 12-2 melts by means of the energy in the pulse laser beam 44. In this manner, a recess or opening which is generally called a pit is formed, so that the information is recorded. In the reconstruction mode, a reconstruction laser beam which has an energy level lower than that of the pulse laser beam 44 is radiated on the optical-disk 10, in the same direction as the pulse laser beam 44 for recording, to optically read the pit, so that the recorded information may be reconstructed.

Figure 3:
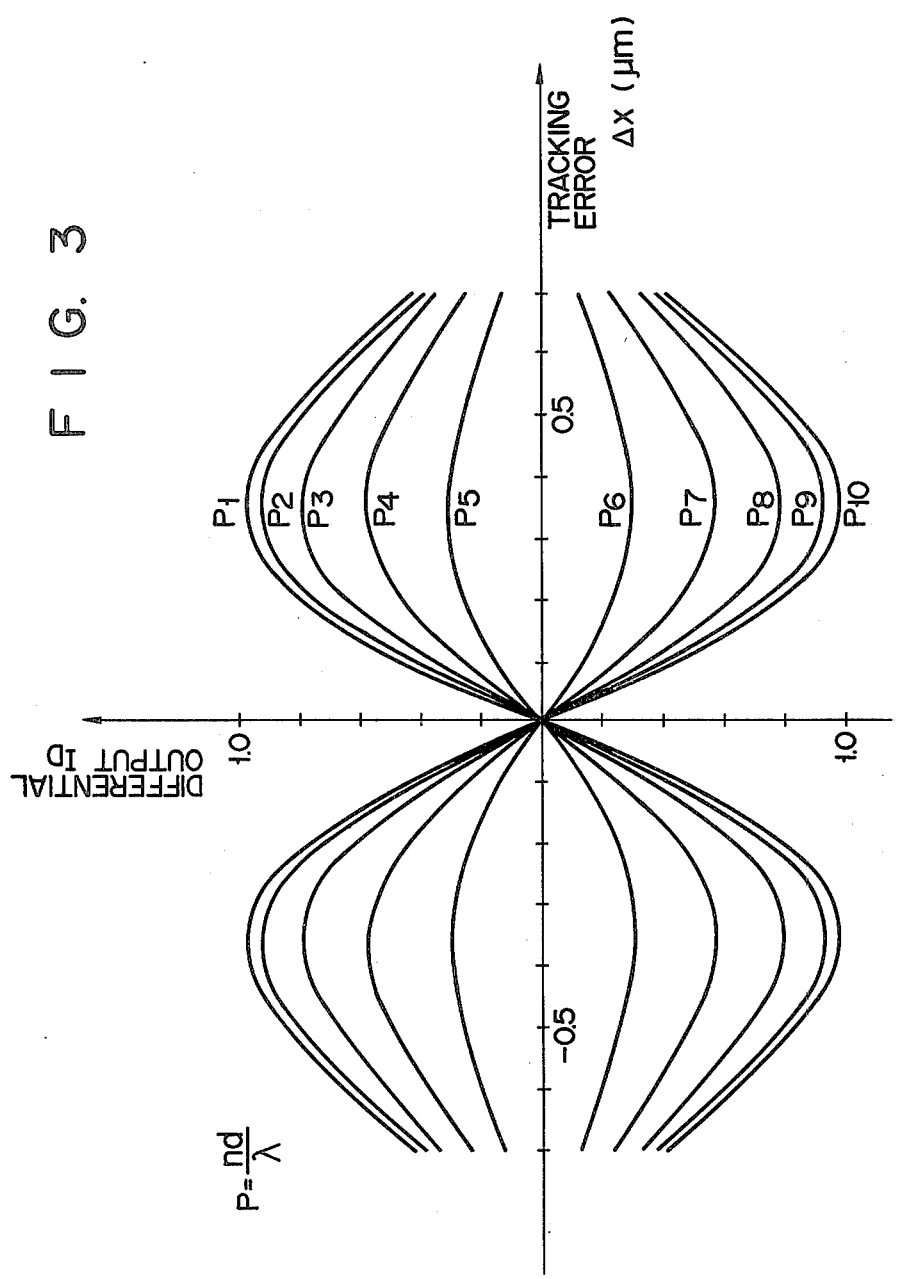
FIG. 3 shows characteristic curves, with a predetermined parameter, which represent correlations between the differential output which is generated from a differentiator and the deviation between the center of the tracking groove of an optical-disk and the center of the laser beam spot radiating on the tracking groove.

FIG. 3 shows characteristic curves representing the correlation between the differential output generated from the differentiator 38 and the position of the spot of the laser beam incident on the optical-disk 10 in the information recording/reconstruction apparatus shown in FIG. 2. Referring to FIG. 3, along the abscissa is plotted the tracking error $\Delta x(\mu m)$ between the center of the spot of the laser beam which is incident of the optical-disk 10 and the center of the tracking groove, and along the ordinate is plotted the differential output $I_D$ which is output from the differentiator 38. These characteristic curve are obtained using a parameter $P = nd/\lambda$, where n is the refractive index of the transparent substrate 11, d is the depth in μm of the tracking groove 12, and λ is the wavelength in μm of the laser beam used. The value of the parameter P is set according to the table below:

TABLE

| Parameter P | Value |
| --- | --- |
| $P_1$ | 0.375 |
| $P_2$ | 0.350, 0.400 |
| $P_3$ | 0.325, 0.425 |
| $P_4$ | 0.300, 0.450 |
| $P_5$ | 0.275, 0.475 |
| $P_6$ | 0.025, 0.225 |
| $P_7$ | 0.050, 0.200 |
| $P_8$ | 0.075, 0.175 |
| $P_9$ | 0.100, 0.150 |
| $P_{10}$ | 0.125 |

Note: the characteristic curves coincide with the abscissa when the values of the parameter P are 0, 0.250 and 0.500.

In the table shown above, it is assumed that a Gaussian beam having a wavelength $\lambda = 0.633$ μm is radiated on the tracking groove 12 of the optical-disk 10 through the condenser 32 having a numerical aperture (N.A.) of 0.6, so that the spot diameter may become 1 $\mu m \phi (1/e^2)$.

As may be seen from the characteristic curves shown in FIG. 3, the differential output $I_D$ from the differentiator 38 has a period $nd = \lambda/2$, and the percentage modulation of this differential output becomes maximum when $nd = m\lambda/8$ where m is an odd integer. The differential output $I_D$ changes, largely, depending on the depth of the tracking groove 12. Therefore, in order to obtain excellent and stable differential outputs (in other words, in order to detect with good precision the deviation of the laser beam spot from the tracking groove), it is necessary to select the depth d of the tracking groove 12 according to the characteristic curve shown in FIG. 3 so as to satisfy equation (1) below:

$$nd = (m/8 \pm 0.05)\lambda \qquad (1)$$

If the transparent substrate 11 is made of a glass or an acrylic resin, the refractive index n of the substrate 11 is 1.5. Furthermore, since the wavelength λ of the laser beam is selected to be 0.633 μm, the allowable error $E_r$ of the depth d of the tracking groove may be given by:

$$E_r = \pm 0.05 \times \lambda/n \simeq \pm 0.021 \; (\mu m) \qquad (2)$$

where "$\simeq$" denotes nearly equal.

However, this allowable error $E_r$ of the depth d of the tracking groove given by equation (2) imposes an extremely strict limit to the outer dimension of the optical-disk. Therefore, it is very difficult or practically impossible to form the tracking groove with high precision on the entire surface of the optical-disk 10 during the manufacture thereof within the allowable error $E_r$.

FIG. 4 is a sectional view of an optical-disk 50 along the radial direction thereof according to an embodiment of the present invention. Tracking grooves 54-1, 54-2, and so on continuously, for example, spirally extend on one surface of the transparent substrate 52 and have a rectangular section of 0.6 μm width. These tracking grooves 54 are formed to have the depth d by the injection technique. A transparent layer 56 is formed on the transparent substrate 52 by application of a known spinner or the like. A recording layer 58 and a protective layer 60 are formed on the transparent layer 56.

The refractive index of the transparent substrate 52 is represented by $n_1$, and the refractive index of the transparent layer 56 is represented by $n_2$. When the laser beam 44 is incident on the tracking groove 54-2, the phase difference between the laser beam which becomes incident on the recording layer 58 through the tracking groove 54-2 and the laser beam which reaches the recording layer 58 in such a manner as to be deflected from the tracking groove 54-2 may be given by the following relation in correspondence with equation (1) described above:

$$\Delta nd = (m/8 \pm 0.05)\lambda \qquad (3)$$

where, $\Delta n = |n_1 - n_2|$ and m is an odd integer. Since the depth d of the tracking groove 54 may be given by:

$$d = m\lambda/8\Delta n \pm 0.05\lambda/\Delta n \text{ the allowable error } E_r \text{ of the depth d of the tracking groove 54 is obtained as:}$$

$$E_r = \pm 0.05\lambda/\Delta n \quad (4)$$

As may be seen from equation (4) above, the value of $\Delta n$ must be made smaller in order to increase the allowable error $E_r$ of the depth d of the tracking groove 54 during manufacture of the optical-disk 50 shown in FIG. 4. Accordingly, the value of $\Delta n$ is set to be within the range of 0.01 to 0.5, preferably within the range of 0.02 to 0.2. When the value of $\Delta n$ is less than 0.01, it is difficult to manufacture the transparent substrate 52 which has guide grooves which, in turn, have a depth of $0.633/8 \times 0.01 \simeq 8$ μm. On the other hand, when the value of $\Delta n$ is above 0.5, the advantageous effects of the present invention are hard to obtain.

In the embodiment described above, the transparent substrate 52 is made of a polymethyl methacrylate (PMMA) having a refractive index $n_1$ of about 1.49. On the other hand, the transparent layer 56 is made of a polystyrene having a refractive index $n_2$ of about 1.59. Thus, the value of $\Delta n$ corresponding to the difference between these two refractive indices $n_1$ and $n_2$ is 0.1. Assuming that the wavelength of the laser beam used is 0.633 μm which is the same as that of the prior art case shown in FIG. 1, the substitution of $\Delta n = 0.1$ in equation (4) above results in:

$$E_r = \pm 0.317(\mu m) \quad (5)$$

As may be seen from a comparison of equations (2) and (5), the allowable error $E_r$ of the depth d of the tracking groove 54 may be increased 15 times that obtainable with the prior art optical-disk. This means that during manufacture of the optical-disk 50 according to one embodiment of the present invention, the adverse effects of variations in the depth d of the tracking groove 54 which are attributable to the mechanical processing precision may be reduced to about 1/15 that obtainable with the prior art optical disk 10. Therefore, the requirement for processing precision during the manufacture of the optical-disk may be made less strict. Accordingly, the present invention can provide an optical-disk wherein the tracking control may be performed with high precision and the manufacture is easy.

Although the present invention has been shown and described with respect to a particular embodiment, nevertheless, various changes and modifications which are obvious to a person skilled in the art to which the invention pertains are deemed to lie within the spirit, scope, and contemplation of the invention.

In the embodiment described above, the transparent substrate 52 and the transparent layer 56 are made of PMMA and polystyrene, respectively. However, the present invention is not limited to this. For example, they may be made of a hard vinyl chloride having a refractive index of 1.52 to 1.55 and a polymethyl styrene having a refractive index of about 1.55, respectively. The recording layer 58 need not be of single layer structure and may comprise a multilayer structure. In this case, the signal-to-noise ratio may be improved and better adiabatic effects are obtained.

In the embodiment shown in FIG. 4, the tracking grooves 54 are formed in the surface of the transparent substrate 52. However, the present invention is not limited to this. For example, the tracking grooves 54 may be formed in the manner as shown in FIG. 5. Describing this in further detail while referring to FIG. 5, the recording layer 58 is formed on one surface of a substrate 62. A transparent layer 64 is formed on the recording layer 58. Projections corresponding to the tracking grooves 54-1, 54-2, and so on of rectangular section are formed on the open surface of the transparent layer 64. A protective layer 66 of a transparent material is formed on the transparent layer 64. This substantially results in formation of the tracking grooves 54 in the layer 66. The pulse laser beam 44 for recording the digital information is radiated from the side of the protective layer 66. The same effects as those obtainable with the optical-disk 50 shown in FIG. 4 are obtained with this structure.

The shape of the cross section of the tracking groove 54 is rectangular in the embodiments described above. However, it may be selected to be trapezoidal or V-shape. Moreover, in FIG. 4, the protective layer 60 is not necessarily be provided. The device may dispense with the protective layer 60 without losing any effect of the present invention.

What is claimed is:

1. A pregrooved optical-disk having a preformed tracking groove onto which a laser beam is radiated, said pregrooved optical-disk comprising:
   (a) a first layer of a transparent substance having a first refractive index $n_1$ having a surface containing said tracking groove;
   (b) a second layer of a transparent material having a second refractive index $n_2$ having a first surface in contact with said surface of said first layer and covering said tracking groove, said second layer having a substantially flat second surface opposite said first surface;
   (c) said tracking groove having depth which is a function of the difference between said first and second refractive indices; and
   (d) a recording layer provided on said second surface of said second layer, onto which the laser beam is incident through said first and second layers, said recording layer being of a substance that is meltable by said laser beam when an energy level of said laser beam exceeds a predetermined level.

2. A pregrooved optical-disk according to claim 1, wherein said first layer is a transparent substrate having the refractive index $n_1$, and said second layer is formed on said transparent substrate.

3. A pregrooved optical-disk according to claim 1, wherein the depth of said tracking groove is defined by $$\Delta n d = (m/8 \pm 0.05)\lambda$$

where
d is said depth,
$\Delta n$ is the absolute value of the difference of the said refractive indices,
m is an odd integer, and
$\lambda$ is the wavelength of said laser beam;
wherein said depth of said tracking groove increases as said $\Delta n$ decreases.

4. A pregrooved optical-disk according to claim 3, wherein $\Delta n$ is in the range of 0.01 to 0.5.

5. A pregrooved optical-disk according to claim 4, wherein $\Delta n$ is in the range of 0.02 to 0.2.

6. A pregrooved optical-disk according to claim 5, wherein the combination of said first layer, said second layer, and said recording layer forms a disk.

7. A pregrooved optical-disk according to claim 6, wherein said tracking groove extends in a circumferential direction of said disk.

8. A pregrooved optical-disk according to claim 5, further comprising a protective layer means, provided on said recording layer, for protecting said recording layer from the external atmosphere.

9. A pregrooved optical-disk according to claim 5, wherein said protective layer means is a predetermined substrate; said recording layer, said second layer and said first layer being sequentially formed on one surface of said substrate.

10. A pregrooved optical-disk according to claim 9, wherein said first surface of said second layer contains a projection corresponding to said tracking groove of said first layer, said first layer being formed on said first surface of said second layer.

* * * * *